United States Patent
Mueller et al.

(10) Patent No.: US 9,268,606 B2
(45) Date of Patent: Feb. 23, 2016

(54) RESOURCE MANAGEMENT SYSTEM FOR AUTOMATION INSTALLATIONS

(71) Applicant: Robert Bosch GmbH, Stuttgart (DE)

(72) Inventors: Frank Mueller, Floersbachtal-Lohrhaupten (DE); Kevin Mueller, Bad Orb (DE)

(73) Assignee: Robert Bosch GmbH, Stuttgart (DE)

( * ) Notice: Subject to any disclaimer, the term of this patent is extended or adjusted under 35 U.S.C. 154(b) by 296 days.

(21) Appl. No.: 13/913,790

(22) Filed: Jun. 10, 2013

(65) Prior Publication Data

US 2013/0339976 A1    Dec. 19, 2013

(30) Foreign Application Priority Data

Jun. 13, 2012   (DE) .......................... 10 2012 011 584

(51) Int. Cl.
*G06F 9/46*   (2006.01)
*G06F 9/50*   (2006.01)

(52) U.S. Cl.
CPC ............... *G06F 9/50* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 5,652,833 A * | 7/1997 | Takizawa et al. | 714/10 |
| 5,825,649 A * | 10/1998 | Yoshimura | 700/82 |
| 6,167,425 A * | 12/2000 | Beckhoff | 718/103 |
| 6,996,699 B2 * | 2/2006 | Chrysanthakopoulos et al. | 712/35 |
| 2008/0114937 A1 * | 5/2008 | Reid et al. | 711/117 |
| 2009/0144531 A1 * | 6/2009 | Harikumar et al. | 713/2 |
| 2010/0138811 A1 * | 6/2010 | Jayaraman et al. | 717/125 |
| 2011/0119422 A1 * | 5/2011 | Grouzdev | 710/262 |
| 2011/0191782 A1 * | 8/2011 | Kim et al. | 718/104 |
| 2012/0084777 A1 * | 4/2012 | Jayamohan | 718/1 |
| 2013/0125117 A1 * | 5/2013 | Niesser et al. | 718/1 |
| 2013/0339648 A1 * | 12/2013 | Zetterman et al. | 711/170 |
| 2014/0059553 A1 * | 2/2014 | Chandhoke | 718/102 |

OTHER PUBLICATIONS

German Patent and Trademark Office Search Report corresponding to DE 10 2012 011 584.9, dated Feb. 13, 2013 (German language document) (5 pages).
VMWare, "VMware vSphere™ 4:The CPU Scheduler in VMware ESX™ 4", Availalble 2009 (22 pages).
Gulati, Ajay et al., "mClock: Handling Throughput Variability for Hypervisor IO Scheduling," USENIC/ACM OSDI, Oct. 6, 2010 (27 pages).
Cucinotta, Tommaso et al., "Real-Time Virtual Machines," Available 2008 (4 pages).

(Continued)

*Primary Examiner* — Emerson Puente
*Assistant Examiner* — Mehran Kamran
(74) *Attorney, Agent, or Firm* — Maginot, Moore & Beck LLP

(57) ABSTRACT

A method for managing resources of a processor device configured to control an automation installation includes using at least one first operating system and at least one second operating system, which preferably differs from the first operating system, to operate the processor device. The processor device includes at least two processor cores configured to operate the operating systems. The method further includes using at least one processor core to operate each operating system and freely selecting a number of processor cores used to operate the first operating system and a number of processor cores used to operate the second operating system.

11 Claims, 1 Drawing Sheet

(56) References Cited

OTHER PUBLICATIONS

Sun Microsystems, Inc., "Sun VirtualBox User Manual," Available 2009 (259 pages).

VMWare, "vSphere Resource Management Guide," Available 2011 (106 pages).

Dedoimedo, "A handful of ESXi tips and tricks," retrieved: http://www.dedoimedo.com/computers/vmware-esxi-tips-tricks.html, Jun. 8, 2011 (7 pages).

Popek, Gerald J. et a., "Formal Requirements for Virtualizable Third Generation Architectures," ACM, 1974 (10 pages).

* cited by examiner

RESOURCE MANAGEMENT SYSTEM FOR AUTOMATION INSTALLATIONS

This application claims priority under 35 U.S.C. §119 to patent application no. DE 10 2012 011 584.9, filed on Jun. 13, 2012 in Germany, the disclosure of which is incorporated herein by reference in its entirety.

BACKGROUND

The present disclosure relates to automation installations and to methods for controlling the latter. Modern automation installations usually have so-called hypervisors, that is to say management systems which manage, for instance, processor powers for the different requirements. Furthermore, such processor devices often have multicore processor systems, that is to say systems having a plurality of processor cores. In this case, these hypervisors usually statically define how many processor cores (also referred to as "cores" below) are available to the individual operating systems of this processor device. Such systems are extensively described in specialist journals. However, such static solutions often do not meet the customer requirements.

In this case, the abovementioned hypervisors usually combine two or more operating systems on one item of multicore hardware. The hypervisor ensures that the respective hardware resources are separated or virtualized.

Therefore, the present disclosure is based on the object of making resource distribution of the available hardware more flexible. This object is achieved by the subject matters of the independent claims. The subclaims relate to advantageous embodiments and developments.

SUMMARY

In the case of a method according to the disclosure for managing the resources of a processor device for controlling an installation, in particular an automation installation, at least one first operating system and at least one second operating system, which preferably differs from the first operating system, are used to operate the processor device (SMP). (A modification with two identical operating systems (AMP) can likewise be used). The processor device also has at least two and preferably at least three processor cores, the processor cores being used to operate the operating systems, and at least one processor core being used to operate each operating system.

According to the disclosure, the number of processor cores used to operate the first operating system and the number of processor cores used to operate the second operating system are freely selectable.

Unlike in the prior art, the processor cores can therefore be allocated to the different operating systems. In this manner, more or less computation power can be provided for the different operating systems depending on the application requirement in order to thus enable time savings overall for the method, for example.

The automation installation is advantageously an installation selected from a group of installations or machines containing packaging installations, printing machines, processing machines, machine tools and the like. The method proposed here is particularly advantageously suitable for installations having a multiplicity of drives.

At least one processor core is advantageously associated with precisely one operating system and is used to operate this operating system. A plurality of processor cores are advantageously associated with precisely one operating system in each case. The processor device is advantageously a so-called hypervisor or virtualization software which provides an environment for a virtual machine, and/or the processor device is part of said hypervisor or virtualization software. This may be a processor device which can be directly operated on hardware without further software. However, it would also be possible for it to be a processor device or a hypervisor based on a fully adequate operating system. It is thus possible for this operating system to have device drivers which are used by the hypervisor. In another advantageous method, the processor device has drivers for its hardware.

At least one processor core advantageously has at least one arithmetic logical unit (ALU) as well as computation registers and preferably also logic circuits which are needed to transport data. Preferably at least one processor core, and particularly preferably a plurality of processor cores, has/have an "interrupted decoder" and preferably also a cache and particularly preferably also a "memory management unit (MMU)" and advantageously also further mechanisms which are connected to the internal architecture of the processor. In addition, a read-only memory or else a random access memory may optionally also be provided.

The processor cores may also be provided with peripherals, for example field bus interfaces or A/D converters.

This plurality of processor cores therefore advantageously form a so-called multicore processor, that is to say a microprocessor having more than one complete main processor on a single chip. All resources, preferably with the exception of the bus and possibly some caches, are advantageously multiply present in this case.

A graphical frontend can be advantageously used to change the distribution of the processor cores.

In this case, it is possible to provide, for example, an "interface" which can be used by the user to set a distribution of the processor cores. Furthermore, it is also possible to provide a visualization device which indicates a current distribution of the processor cores to the user.

The present disclosure is described here with reference to the allocation of processor cores to operating systems. However, it would also be possible to use the disclosure in a similar manner for the allocation of processor cores to general applications. In this case, it would be possible for the user to determine how many processor cores are allocated to a particular application, that is to say how many processor cores are used to process a particular application. The applicant reserves the right to also claim protection for such a refinement.

In one preferred method, the processor device has at least four processor cores, preferably at least six processor cores, preferably at least ten processor cores and particularly preferably at least 100 processor cores.

Customer-specific adaptation of the computation power of a multicore automation system is advantageously enabled in this manner. Depending on the customer application, the user himself can advantageously determine the performance focus of his automation system within particular limits. In the simplest case, it is thus possible to proceed from two operating systems, for example, with one operating system being able to be a Windows or Linux operating system as a GPOS (general purpose operating system) and a real-time operating system (RTOS), for example.

In the case of Windows-intensive applications with little real-time capability, the user can increase the computation power for GPOS (Windows, Linux) and, in the case of automation-intensive applications (PLC, motion, NC), the user can allow increased computation power to flow to said applications. In this case, the user advantageously always uses the same hardware but can scale the latter or optimally distribute its computation power according to his requirements. In particular, with the increasing number of processors to be expected in future, the possibilities for such scaling operations therefore also increase. Ever finer adaptation to the respective applications is also possible with the expected increasing numbers of processor cores.

In solutions known from the prior art, depending on the configuration of the default distribution of processor cores, too few processor resources are available either for the real-time application or for the Windows application (display or logging) even though sufficient processor cores are actually present. It would also be conceivable to provide any desired number of configurations (instead of a default configuration), but this would result in a variety of possibilities and, in addition, a useful distribution of the processor cores is also often not known before the system is started up.

An automation solution with a hypervisor is therefore proposed, which solution allocates the processor cores on multicore hardware—preferably by default—for different operating systems. In the case of four cores for example, one possible allocation would be two cores for one operating system and two cores for the other operating system. If 16 cores are used, eight cores could be allocated to one operating system and a further eight cores could be allocated to the other operating system. However, this allocation is not fixed, but rather there are a plurality of possibilities for allocating the cores for the individual operating systems, for example for applications corresponding to GPOS or RTOS. In the case of four cores for example, it would also be possible to allocate one core to one operating system and three cores to the respective other operating system. Depending on the application (for example an HMI application or a database-intensive or real-time-intensive application (for example a multiplicity of programmable logic controllers)), it may be useful to select one allocation or another.

The disclosure thus proposes an application-specific allocation of multiprocessor cores depending on which of the installed operating systems require more power. A default allocation used in the prior art is always a compromise and is no longer necessary using the described disclosure. In one preferred method, each individual processor core can be associated with each operating system. A predefined default allocation is therefore advantageously dispensed with.

In one preferred method, the number of processor cores used to operate at least one operating system can be changed. The number of processor cores used to operate both operating systems can advantageously be changed. This means that the (numerical) distribution of the processor cores not only of a starting configuration can be selected but this configuration can also be changed as desired.

In a particularly preferred manner, not only is the number of processor cores allocated to a particular operating system freely selectable but rather it is preferred for each processor core to be able to be associated with a particular operating system. Associating the processor cores with the operating systems is understood as meaning, in particular, that the processor associated with an operating system undertakes, in particular, fundamental tasks of this operating system, for instance the management of the system hardware.

In another advantageous method, the number of processor cores used to operate at least one operating system is determined on the basis of a resource requirement of this operating system. In this case, it is preferably also possible to determine the number of processor cores on the basis of a relative resource requirement (that is to say the resource requirement of an operating system based on the resource requirement of at least one further operating system).

If, for example in the case of an arrangement with two operating systems, it is determined that the resource requirement of a first operating system is three times as high as the resource requirement of the second operating system, it would be conceivable to associate three quarters of the processor cores with the first operating system and to associate one quarter of the processor cores with the second operating system.

Within the scope of this application, allocation of the processor cores on the basis of the resource requirement of operating systems is proposed in each case. However, the processor cores can also be accordingly allocated on the basis of, for example, particular applications and their resource requirement. It would thus be conceivable to allocate more processor cores to particularly resource-intensive applications if necessary.

In another method, the processor device has at least four processor cores.

At least one operating system is advantageously a real-time-based operating system.

In another advantageous method, at least one operating system is a non-real-time-based operating system. Both a real-time-based operating system and a non-real-time-based operating system are therefore advantageously used.

In another advantageous embodiment, data characteristic of a resource requirement of at least one operating system are displayed. For example, it is thus possible for a display device and preferably a graphical tool, which assists the user when adapting the processor cores to the individual operating systems, to be available. In this case, hyperthreading data, common cache usage and the like may advantageously be visualized.

This hyperthreading (or possibly so-called "simultaneous multithreading (SMT)") can be used to make better use of the arithmetic units of a processor by filling the gaps in the respective pipelines with instructions from another thread as well as possible. Such gaps may occur, for example, if a process or thread must wait for the main memory as a result of a "cache miss". In this case, the hyperthreading can be used to insert a further process or thread which therefore runs in a parallel manner.

The processor unit with the hyperthreading is advantageously designed like a symmetrical multiprocessor system. A hyperthreading method for operating the processor unit is therefore advantageously provided. The abovementioned multithreading is understood as meaning the simultaneous execution of a plurality of threads inside an individual processor or inside an individual application program. In this case, it is possible for such multithreading or else hyperthreading to be executed on only one processor core, but it is also possible to provide a combination with multiprocessing which allows true parallel execution by a plurality of processor cores.

In another advantageous method, at least one allocation configuration of the processor cores is stored in a memory device. For example, it would thus be possible for the last known advantageous configuration to be stored. In addition, it would also be conceivable to store a plurality of configurations.

During allocation, it is also possible to prevent useless settings from the outset, for example the use of all cores for one of a plurality of operating systems.

The present disclosure is also directed to a management system for a processor device for controlling an installation, in particular an automation installation. In this case, the processor device has at least two operating systems or, more generally, is operated by at least two different operating systems and/or has at least two different applications. Furthermore, at least two processor cores and preferably at least processor cores are available for operating these operating systems, at least one processor core being allocated to each operating system.

According to the disclosure, the number of processor cores used to operate the first operating system and the number of processor cores used to operate the second operating system are (freely) selectable.

The management system is advantageously a hypervisor.

In another advantageous embodiment, the processor device is also a control device which controls at least one component of the automation installation. The automation installation advantageously has at least one drive device.

In another advantageous embodiment, the management system, and the processor device in particular, has a display device which is suitable for displaying at least one value which is characteristic of the resource requirement of at least one operating system.

A user can advantageously predefine the allocation of the processor cores. However, it would also be conceivable to provide a further processor device which detects the respective resource requirements and allocates the numbers of cores to the individual operating systems on the basis thereof in each case.

In this case, it is also possible for this allocation to change during working operation of the automation installation.

In another advantageous embodiment, at least one operating system is real-time-based and, in another advantageous embodiment, at least one operating system is not real-time-based.

A cache is advantageously allocated to each processor core. In this case, it is possible for precisely one cache to be associated with each processor core, but one cache can preferably be associated with a plurality of processor cores. However, it is thus particularly preferred for each cache to be associated with precisely one operating system.

This allocation of the caches to the processor cores is advantageously also variable.

Furthermore, it is also possible for the management system to be operated with more than two operating systems, for example three, four, five or more operating systems.

BRIEF DESCRIPTION OF THE DRAWINGS

Further advantages and embodiments emerge from the accompanying drawings, in which.

DETAILED DESCRIPTION

Figure 1:
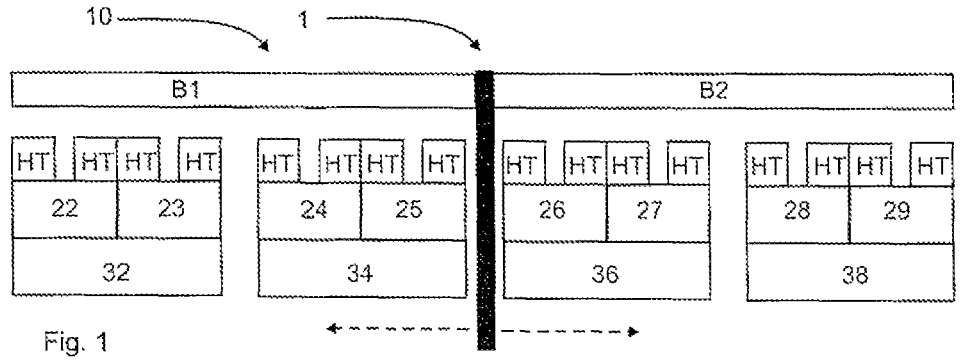
FIG. 1 shows an illustration of a management system in a first configuration.

FIG. 1 shows a management system 1 in a first configuration. A processor device denoted in its entirety using 10 is provided in this case. This processor device is operated in this case by a first operating system B1 and a second operating system B2. In this case, the first operating system B1 is a so-called GPOS (general purpose operating system). The operating system B2 is a real-time operating system (RTOS).

It is seen that the management system has a total of eight processor cores 22, 23 ... 28, 29 in this case. In the configuration shown in FIG. 1, the four processor cores 22, 23, 24 and 25 are associated in this case with the first operating system B1 and the processor cores 26, 27, 28 and 29 are associated with the second operating system B2. The reference symbols 32, 34, 36 and 38 each refer to memory devices or caches, two processor cores being associated with one cache in each case. It can also be derived from FIG. 1 that the so-called hyperthreading (HT) is activated. The vertical black bar in the center shows the separating line which is used to allocate the processor cores 22-29.

Figure 2:
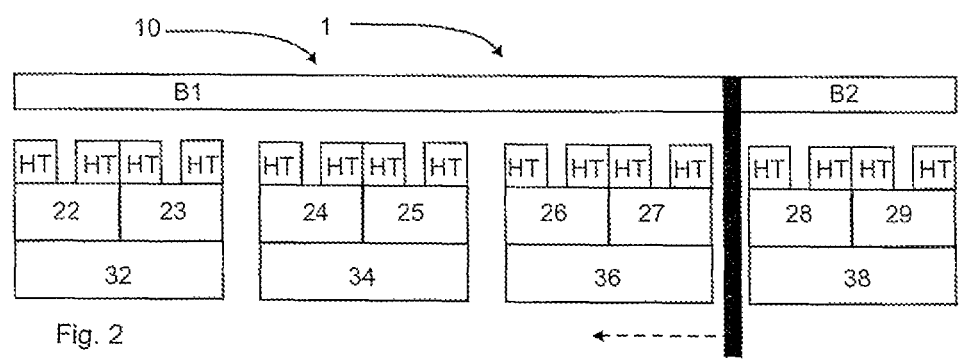
FIG. 2 shows an illustration of a management system in a second configuration.

FIG. 2 shows another possible configuration for a system having two operating systems B1 and B2. In this configuration, a total of six processor cores 22-27 are associated with the general purpose operating system (GPOS) or the first operating system B1 and only two processor cores are associated with the second operating system B2. This configuration is particularly suitable for those applications in which the non-real-time resources are required more than the real-time resources.

Figure 3:
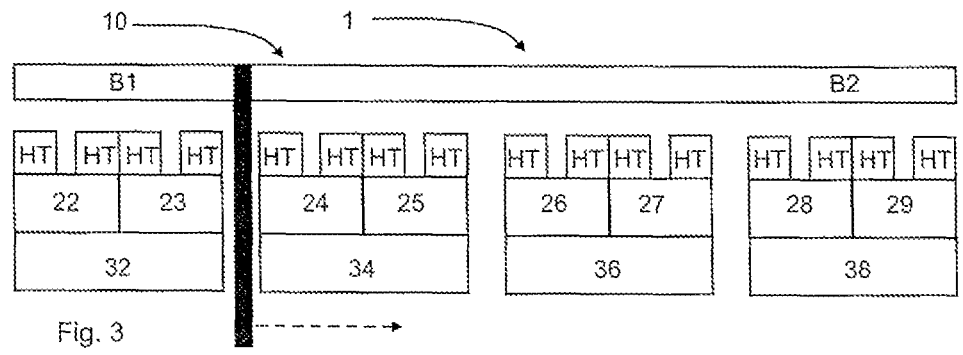
FIG. 3 shows an illustration of a management system in a third configuration.

FIG. 3 shows another possible refinement of a processor device 10. In this application, two processor cores are associated with the first operating system B1 and six processor cores are associated with the second operating system B2. This configuration is particularly suitable for real-time-intensive applications.

Figure 4:
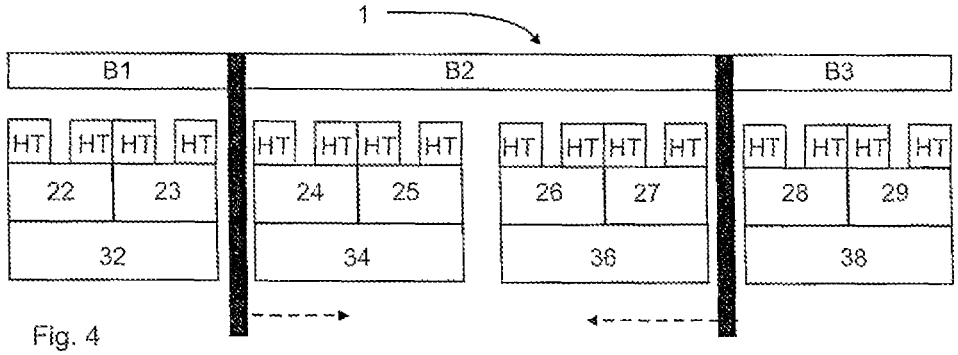
FIG. 4 shows an illustration of a further management system in an advantageous configuration.

FIG. 4 shows another advantageous refinement. A total of three operating systems B1, B2 and B3 are provided in this refinement, the first operating system B1 being a general purpose operating system and the two operating systems B2 and B3 each being real-time operating systems (RTOS). In this refinement, a total of four processor cores are associated with the second operating system B2 and two processor cores are associated with the first operating system B1 and two processor cores are likewise associated with the third operating system B3.

However, the diagram in FIGS. 1-4 can also be extended to a plurality of processor cores and also to a plurality of operating systems. In principle, any desired allocation of the processor cores and of the respective numbers of processor cores to the operating systems is possible. In this case, however, at least one processor core is advantageously associated with each operating system. At least one cache 32, 34, 36 and 38 is also advantageously associated with each operating system.

The applicant reserves the right to claim all features disclosed in the application documents as essential to the disclosure if they are novel over the prior art individually or in combination.

List of Reference Symbols
B1 First operating system
B2 Second operating system
B3 Third operating system
1 Management system
10 Processor device
22 Processor core
23 Processor core
24 Processor core
25 Processor core
26 Processor core
27 Processor core
28 Processor core
29 Processor core
32 Memory device/cache
34 Memory device/cache
36 Memory device/cache
38 Memory device/cache
HT Hyperthreading

What is claimed is:

1. A method for managing resources of a processor device configured to control an automation installation, comprising:
using at least one first operating system and at least one second operating system to operate the processor device, the at least one second operating system differing from the at least one first operating system and at least one of the at least one first operating system and the at least one second operating system is a real-time-based operating system;
operating the at least one first operating system with at least one processor core of a plurality of processor cores of the processing device;
operating the at least one second operating system with at least one other processor core of the plurality of processor cores of the processing device;
displaying data characteristic of a resource requirement of at least one of the at least one first operating system and the at least one second operating system, the data including simultaneous multi-threading data and common cache usage data;
freely selecting, by using a graphical tool, a first number of processor cores of the plurality of processor cores used to operate the at least one first operating system; and
freely selecting, by using the graphical tool, a second number of processor cores of the plurality of processor cores used to operate the at least one second operating system; and
wherein the processor cores of the real-time-based operating system are selected by using the graphical tool and on the basis of the displayed data, so that cache misses caused by at least one other of the operating systems are minimized for the real-time-based operating system.

2. The method according to claim 1, wherein:
the first number of processor cores is changeable on the basis whether the first operating system shall be used as an application selected from a group of a human-machine interface (HMI) application, database-intensive application and real-time-intensive application; and
the second number of processor cores is changeable on the basis whether the second operating system shall be used as an application selected from a group of HMI application, database-intensive application and real-time-intensive application.

3. The method according to claim 1, further comprising:
determining the first number of processor cores based on a common cache usage as a resource requirement of the at least one first operating system; and
determining the second number of processor cores based on a common cache usage as a resource requirement of the at least one second operating system.

4. The method according to claim 1, wherein the plurality of processor cores includes at least four processor cores.

5. The method according to claim 1, wherein at least one of the at least one first operating system and the at least one second operating system is a non-real-time-based operating system.

6. The method according to claim 1, further comprising:
storing at least one allocation configuration of the plurality of processor cores in a memory device.

7. The method according to claim 1, wherein each processor core of the real-time-based operating system is associated with one cache.

8. A management system for a processor device configured to control an automation installation, comprising:
at least one first operating system;
at least one second operating system, wherein at least one of the at least one first operating system and the at least one second operating system is a real-time-based operating system;
at least one processor core of a plurality of processor cores of the processing device being allocated for operating the at least one first operating system, a first number of the processor cores allocated for operating the at least one first operating system being freely selectable;
at least one other processor core of the plurality of processor cores of the processing device being allocated for operating the at least one second operating system, a second number of the processor cores allocated for operating the at least one second operating system being freely selectable;
a display device configured to display data characteristic of a resource requirement of the at least one of the at least one of the first operating system and the at least one second operating system, the data including simultaneous multi-threading data and common cache usage data; and
a graphical tool for freely selecting the cores of the real-time-based operating system on the basis of the data displayed by the display device, so that cache misses caused by at least one other of the operating systems are minimized for the real-time-based operating system.

9. The management system according to claim 8, wherein each processor core of the real-time-based operating system is associated with one cache.

10. The automation installation of claim 8 further comprising:
a plurality of drives that are operatively connected to the processor device to receive commands from the real-time-based operating system.

11. The automation installation of claim 8 wherein the automation installation is selected from a group of installations or machines containing packaging installations, printing machines, processing machines and machine tools.

* * * * *